(12) United States Patent  
Lontka et al.

(10) Patent No.: US 6,738,238 B2
(45) Date of Patent: May 18, 2004

(54) FIRE DETECTION SYSTEM INCLUDING AN AUTOMATIC POLARITY SENSING POWER AND SIGNAL INTERFACE

(75) Inventors: Bruce J. Lontka, Randolph, NJ (US); Peter Sun, West Orange, NJ (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 0 days.

(21) Appl. No.: 10/199,700

(22) Filed: Jul. 19, 2002

(65) Prior Publication Data

US 2003/0048652 A1 Mar. 13, 2003

Related U.S. Application Data

(60) Provisional application No. 60/306,778, filed on Jul. 20, 2001.

(51) Int. Cl.$^7$ .......................... H02H 7/00; G08B 29/00
(52) U.S. Cl. ........................ 361/18; 361/21; 340/506
(58) Field of Search .................... 363/89, 91, 95, 363/97, 16, 17, 19, 20; 361/18, 21; 340/506, 505, 533, 825.06, 825.07

(56) References Cited

U.S. PATENT DOCUMENTS

| 3,619,723 | A | | 11/1971 | Walden | 317/18 |
|---|---|---|---|---|---|
| 3,767,998 | A | | 10/1973 | Beling | 321/18 |
| 4,277,692 | A | | 7/1981 | Small | 307/66 |
| 4,319,144 | A | | 3/1982 | King et al. | 307/236 |
| 4,535,203 | A | | 8/1985 | Jenkins et al. | 179/81 |
| H64 | H | | 5/1986 | Maleis | 357/42 |
| 4,686,614 | A | * | 8/1987 | Costello | 363/17 |
| 5,081,411 | A | | 1/1992 | Walker | 323/326 |
| 5,508,603 | A | | 4/1996 | Strong, III | 323/234 |
| 5,940,280 | A | | 8/1999 | Murai et al. | 363/17 |
| 6,262,903 | B1 | | 7/2001 | Fujihashi et al. | 363/89 |
| 6,272,027 | B1 | | 8/2001 | Fraidlin et al. | 363/26 |
| 6,275,401 | B1 | | 8/2001 | Xia | 363/127 |

* cited by examiner

Primary Examiner—Rajnikant B. Patel

(57) ABSTRACT

A fire detection system comprising a control panel comprised of one or more controllers for controlling a plurality of devices. A pair of lines are operably connected to the control panel and the devices for communicating signals between said control panel and said devices. A circuit for providing a polarity sensing power and signal interface is provided between the control panel and devices to reduce to reduce system maintenance. The circuit includes a rectifier circuit operably connected the pair of lines wherein the rectifier circuit is comprised of at least two transistors for providing the circuit with a low-impedance path to ground and providing the circuit with a polarity insensitive output. Capacitors may be operably connected to the transistors in the rectifier circuit to keep the transistors turned on when a low voltage is applied to the rectifier circuit.

43 Claims, 3 Drawing Sheets

FIRE DETECTION SYSTEM INCLUDING AN AUTOMATIC POLARITY SENSING POWER AND SIGNAL INTERFACE

This application claims the priority to and the benefit of Provisional Application No. 60/306,778 entitled "Fire Safety System," filed Jul. 20, 2001.

CROSS-REFERENCE TO RELATED CO-PENDING APPLICATIONS

The following patent applications cover subject matter related to the subject matter of the present invention: "Fire Protection System and Method for Configuring" U.S. Ser. No. 10/198,803; "Portable Diagnostic Device" U.S. Ser. No. 10/199,517; "User Interface for Fire Detection System" U.S. Ser. No. 10/199,802; "User Interface with Installment Mode" U.S. Ser. No. 10/199,801.

BACKGROUND OF THE INVENTION

In fire safety systems, control panels are commonly employed to control devices such as smoke detectors via a two-line connection. From the two-line connection such devices will derive power, transmit and receive communication signals from the control panel. Intervening circuitry, comprised of a full-wave rectifier including four diodes, is generally connected to the two-line connection and is operatively located between the control panel and each device in the system to extract power and signals from the two-line connection to the sensor. The problem with such full-wave rectifier circuitry is that when the diodes in the rectifier are isolated, stray noise gets inside of diode bridge, producing a bias that causes signals between devices and the control panel to be lost.

Another problem with such rectifier circuits is that a soon as the rectifier circuit begins to develop a signal, the ground point of the circuit can become more negative that the diodes in the circuit, which may cause the diodes to stop conducting, disconnecting the circuit. This problem is magnified when any lines from monitoring or measuring equipment are connected to the rectifier circuit. These lines may pick-up noise and this noise may directly couple with internal capacitances of the circuit, driving the ground of the circuit even further negative.

A further problem with known systems where two-line connections are provided, from a control panel to one or more devices, is that due to human failure, the lines are commonly reversed, causing additional time and expense to correct the polarity reversal. Typically, such systems are polarity sensitive, so that they can be installed in only one manner. In order to reduce system commissioning time and expense, it is desirable to have an automatic polarity sensing power and signal interface between the control panel and the devices to eliminate the need to correct the polarity reversal.

It is therefore a primary object of the invention to provide a rectifier circuit with limited susceptibility to noise. It is a further object of the invention to provide an automatic polarity sensitivity power and signal interface.

SUMMARY OF THE INVENTION

These and other objects are achieved in accordance with the invention herein described. In fire safety systems, smoke detectors operate commonly with a two-line connection to a control panel. On these two lines the smoke detector derives power and transmits/receives communication signals. The present invention implements a full-wave rectifier comprising, in the preferred embodiment, a pair of diodes and a pair of transistors. The disclosed circuit automatically detects a polarity reversal at the two-line connection and still provides a proper output. The disclosed full-wave rectifier and accompanying circuitry below, provides a polarity insensitivity feature when two input lines are reversed, without requiring the use of logic circuitry. Further, the pair of transistors provides a low-impedance ground potential, substantially limiting noise within the rectifier circuit. The pair of transistors are used with the disclosed rectifier circuit to provide a low impedance path back to the internal ground from whichever of the two lines on the two-line connection is negative. The full-wave rectifier with two transistors and two diodes provides a low distortion output signal with a polarity insensitivity feature when the two input lines are reversed. As the transistors in the rectifier circuit provide resistance in both directions, noise is further limited since a path for noise is always provided between the internal ground and the negative line.

One object of the present invention is to provide a fire safety system having a control panel comprised of one or more controllers for controlling a plurality of devices which report system events back to the control panel. Preferably, a pair of lines are operably connected to the control panel and the plurality of devices for communicating signals between the control panel and the devices. At least one rectifier circuit may be operatively connected between the pair of lines and at least one device, such that the at least one rectifier circuit is comprised of at least a first transistor and a second transistor. Each transistor provides the rectifier circuit with a low-impedance ground path when turned on. The transistors further provide the circuit with a polarity insensitive output. Preferably, a sensing circuit is operatively connected between the rectifier circuit and at least one device. Each device may be provided with a device controller. Together, the sensing circuit and the device controller extract a signal from the rectifier circuit to be received by the device.

BRIEF DESCRIPTION OF THE DRAWINGS

While the specification concludes with claims particularly pointing out and distinctly claiming the invention, it is believed that the same will be better understood from the following description taken in conjunction with the accompanying drawings in which:

DETAILED DESCRIPTION

Figure 1:
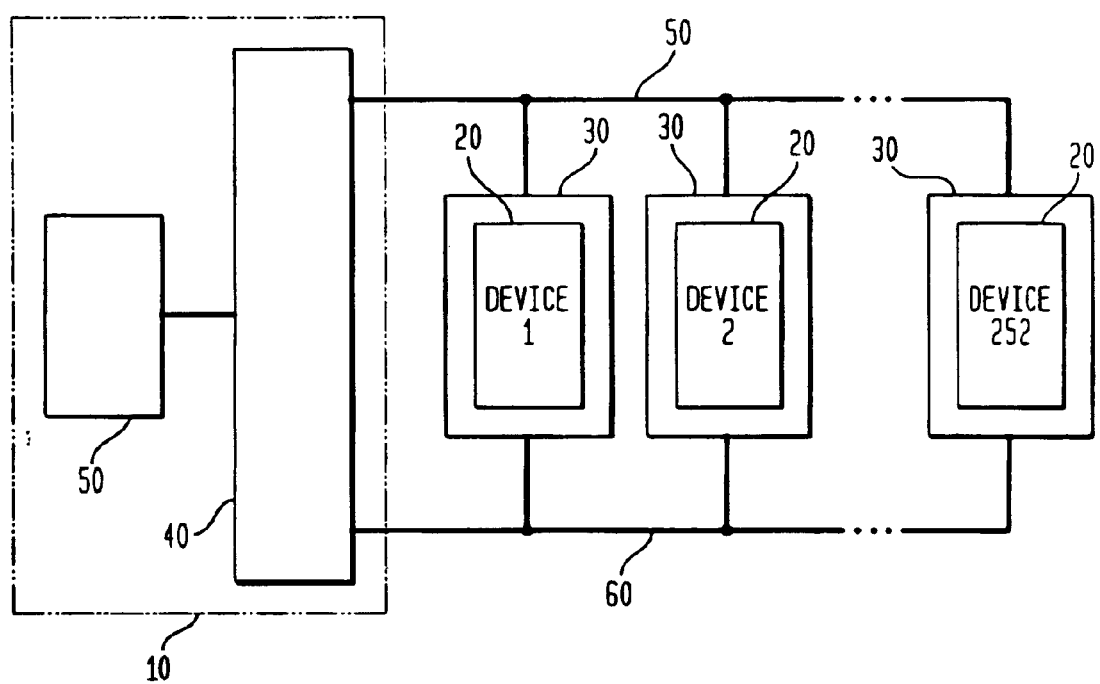
FIG. 1 is a schematic block diagram of apparatus of the present invention shown integrated in a fire safety system.

The present invention relates to an automatic polarity sensing power and signal interface for a controller and one or more devices to be controlled. In one preferred embodiment, the disclosed automatic polarity sensing power and signal interface is used in a fire safety system. As shown in FIG. 1, the fire safety system of the present invention is comprised of a control panel 10, a plurality of devices 20 to be controlled by the control panel 10, and intervening circuitry 30. Preferably, the control panel 10 includes a controller 40 such as a device loop card that can control up to 252 devices 20 such as smoke detectors, relay bases, audible bases and remote lamps and other types of devices commonly used in fire safety systems in any combination. While FIG. 1 shows the use of a single controller for controlling up to 252 devices, the control panel may be provided with a plurality of controllers, whereby each controller may control up to 252 devices. The control panel will preferably also include a user interface, not shown.

The controller 40 initializes, operates and maintains all devices 20 residing in the fire safety system and communicates all relevant device 20 and event information, such as alarms and troubles, to the system CPU 50. The controller 40 may be provided with a pair of driver circuits such as operational amplifiers, not shown, from which parallel input/output lines 50 and 60 are connected. Bridged across parallel lines 50 and 60 are up to 252 devices 20 with intervening circuitry. Lines 50 and 60 allow the controller 40 to receive and transmit data from the devices 20 connected between lines 50 and 60. While the preferred embodiment shows the devices and intervening circuitry bridged between lines 50 and 60, the devices 20 and the intervening circuitry need not be physically located between lines 50 and 60.

Figure 2:
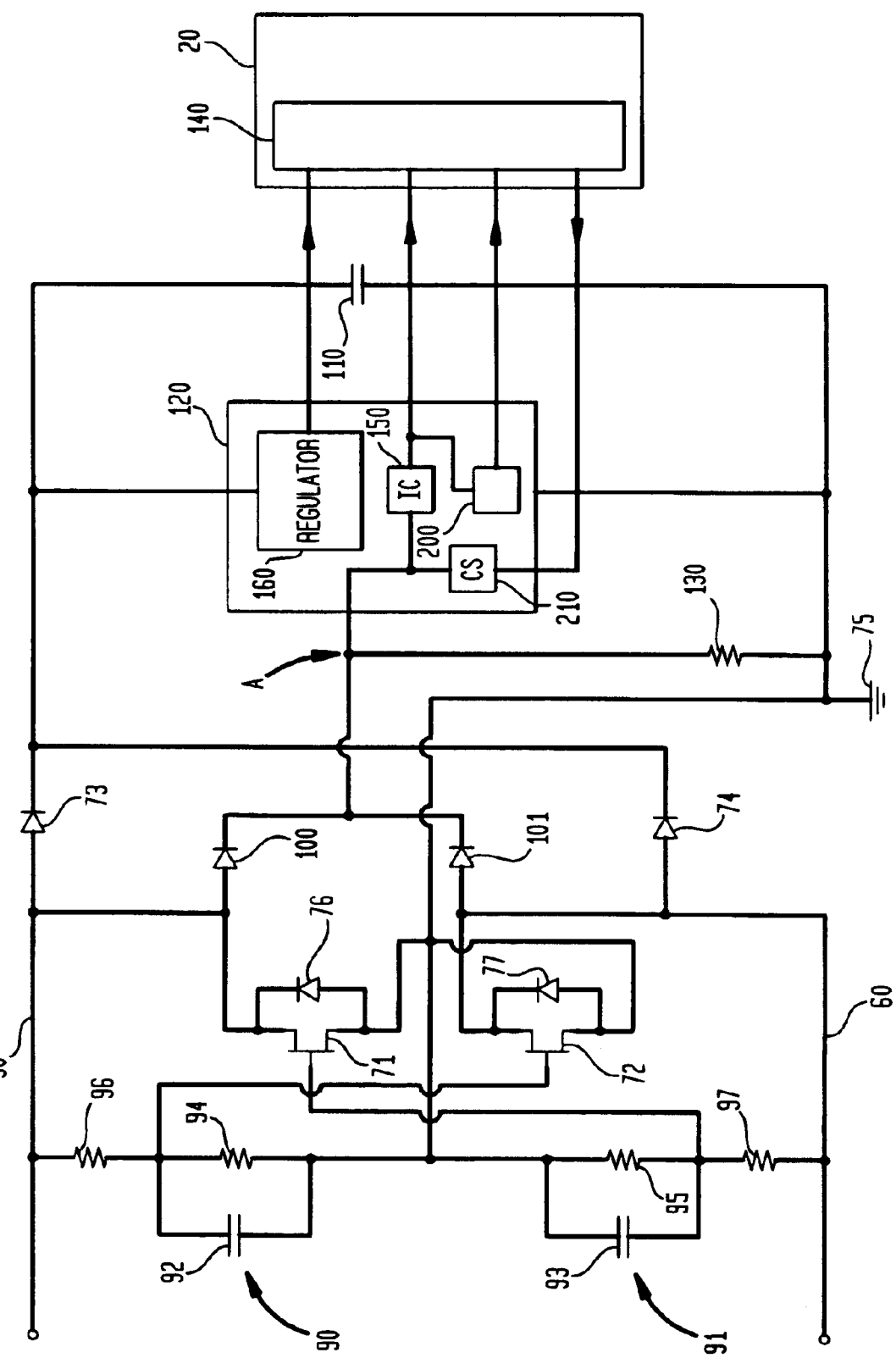
FIG. 2 is a schematic diagram of electrically circuitry for providing an automatic polarity sensing power and signal interface.

FIG. 2 illustrates a automatic polarity sensing power and signal interface for a fire safety systems, though such an interface can be used with any type of system. Inductors, not shown, may be connected in series with each line 50,60 to reduce noise. Connected between line 50 and line 60 is a full-wave bridge rectifier circuit 70. In a preferred embodiment, the rectifier circuit 70 is comprised of a pair of transistors 71,72 and a pair of diodes 73,74. Diodes 73,74 may be nearly any type of power diode, and preferably have sufficient current ratings for the circuit being powered, While the preferred embodiment includes the use of two diodes and two transistors, the rectifier circuit may also be comprised of four transistors. The transistors 71,72 will preferably be FET type transistors such as MOSFETS. While FETs are preferably used in the present invention, other types of switching devices may be used in place of FETs that can provide similar performance characteristics as transistors.

The bridge rectifier 70 is provided to extract power and signals transmitted by the controller 40 of the control panel 30 over lines 50 and 60 to a device 20. In the present invention, the transistors 71,72 conduct and provide resistance in both directions, such that the transistors 71,72 provide a low-impedance return between whichever line 50 or 60 is negative and the internal ground 75, eliminating noise and stray signals in the circuit. As will be discussed further, the use of a pair of transistors 71,72 in the full-wave bridge rectifier 70 further provide a polarity insensitive feature when the two input lines 50 and 60 are reversed. The disclosed circuit in FIG. 2 also includes an internal ground 75.

As further shown in FIG. 2, RC circuits 90, 91 are operably connected to the gates of the transistors 72,71. RC circuit 90 is comprised of capacitor 92 and resistors 94 and 96, while RC circuit 91 is comprised of capacitor 93 and resistors 95 and 99. RC circuit 90 is operably connected to transistor 72, and RC circuit 91 is operably connected to transistor 71. Capacitor 92 is operably connected between the source and gate of transistor 72, and capacitor 93 is operably connected between the source and gate of transistor 71. Each RC circuit 90,91 provides a RC time constant acting as 2–1 voltage divider to keep the transistors of the circuit within gate breakdown voltage. Each RC circuit 90, 91 provides inherent transient protection to protect the gates of the transistors 72,71, and guarantees that when there is no voltage during portions of the communications waveform, biasing remains on the gates of transistors 71 and 72, so that when transistor 71 or 72 is conducting, the transistor 71,72 will continue to conduct, and that when transistor 72,71 is shut off while the other transistor 71,72 is conducting, the transistor 72,71 will remain shut off. The resistors of the circuit provide a voltage divider to prevent gate breakdown voltage from being exceeded. The thevinin equivalent of the two resistors 94,96 and 95,97 and the capacitors 92,93 connected to each transistor 71,72 represent the hold time for each transistor 71,72 to reach conducting when the voltage on the pair goes to zero voltage, below the turn on value for the transistors 71,72 occur during brief periods in the communication waveform.

The RC circuit for one transistor is always referenced to the opposite line i.e., transistor 71 is operatively connected to RC circuit 91, while transistor 72 is operatively connected to RC circuit 90. When line 50 of the circuit shown in FIG. 2 has a positive potential, that is, a higher voltage than line 60, the resistor 96 begins to bias the gate of transistor 72, turning transistor 72 on. Transistor 72 turns on due to the voltage level at the internal ground being below the voltage at the gate of transistor 72. The gate of transistor 71 begins to discharge such that transistor 71 begins to turn off if it was already turned on. When the circuit shown in FIG. 2 is in its initial condition and both FETs are turned off, the circuit starts by means of two paths, assuming line 50 is positive, the waveform travels from line 50 to resistor 96 to the gate of transistor 72 to the source of transistor 72 to line 60. Regarding the RC circuit, assuming line 50 is positive, the waveform travels from line 50 to resistor 96 to resistor 94 and capacitor 92 to diode 77 to line 60. When line 60 of the circuit shown in FIG. 2 has a positive potential, the resistor 94 begins to bias the gate of transistor 71, turning transistor 71 on. Transistor 71 in this circumstance will turn on due to the voltage level at the internal ground being below the voltage at the gate of transistor 71. The gate of transistor 72 then begins to discharge such that transistor 72 turns off. Each RC circuit 90, 91 guarantees that when there is no voltage, biasing remains on the gates of transistors 71 and 72, so that when either transistor 71 or 72 is conducting, the transistor will continue to conduct, and that when transistor 71,72 is shut off while the other transistor 72,71 is conducting, the transistor 71,72 will remain shut off.

The rectifier circuit shown in FIG. 2 will therefore provide power and signals to the device 20 from the control panel 10 regardless of whether line 50 or line 60 is positive. Accordingly, by providing a rectifier circuit comprised of at least two transistors 71,72, a polarity insensitive feature is provided.

Figure 3:
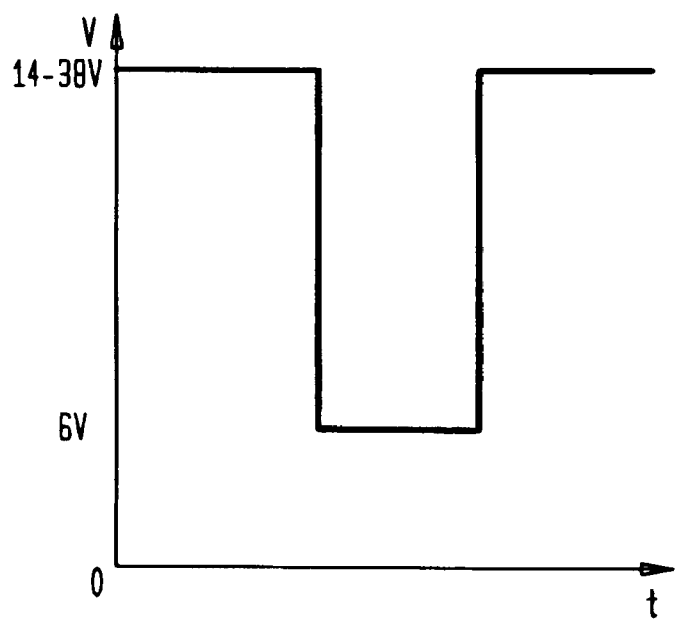
FIG. 3 depicts waveforms of the system when power is applied to the system.

As shown in FIG. 3, voltages varying between 29–36V and 0V can be applied to the disclosed circuit. The capacitors 90,91 are provided to slow down the response of the transistors 71,72 so that the transistors 71,72 conduct when a low voltage is applied to the circuit. The RC circuits are designed to provide a delay due to capacitors 90,91 so that the circuit maintains low impedance when voltage drops below a certain value, such as 6V. The RC circuit maintains low impedance when voltage drops on each transistor 71, 72 for predetermined intervals of time. Capacitors 90,91 provide a function of keeping the voltage on the transistor gates higher than the gate "turn on" voltage when the line voltage drops down to 6 volts or below. Accordingly, due to the performance of capacitors 90, 91, the voltages applied to transistors 71,72 never falls below 6V.

The circuit shown in FIG. 2 further includes a pair of reverse bias diodes 76,77 connected to the sources of transistors 71,72. Diodes 76,77 are usually provided internal to the FETs. However, diodes 76,77 may also be provided as external components in circumstances where transistors 71,72 are not provided internally with reverse bias diodes. The reverse bias diodes 76,77 block reverse current flow that may cause the transistors 71,72 to reverse at undesired times. As further shown in FIG. 2, connected between the source and drain of transistors 71,72 are diodes 78,79. In the circuit shown in FIG. 2, the internal ground 75 has no reference when power is first applied to the circuit. In the first instant power is applied to the circuit, one of the parasitic diodes 78,79 begins to conduct, depending upon which line 50 or 60 is positive, and provides the circuit with an initial ground reference. For example, when line 50 is positive, diode 77 will begin to conduct. In the alternative, when line 60 is positive, diode 76 will begin to conduct. When parasitic diode 77 or 76 begins to conduct, it starts charging the storage capacitor 92, 93 that turns the respective transistor 71,72 on, and shunts respective parasitic diode 78,79 off. The disclosed circuit will start without the use of parasitic diodes 78,79, but the parasitic diodes significantly increase the speed in which transistors 71,72 will turn on.

As shown in FIG. 2, the circuit is further provided with sensor circuit comprised of diodes 100,101 and resistor 130 connected in parallel. The circuit in FIG. 2 further includes filter capacitor 110, IC 120. The positive line 50,60 is connected respectively through diodes 73,74 to charge the power storage capacitor 110. Resistor 130 is provided to limit parasitic charges if the input impedance of IC 120 is too high. Signals, superimposed on DC voltages, are transmitted from the controller 40 through the rectifier circuit through the sensor circuit, and are transmitted to the IC 120 to be detected. The capacitor 110 provides energy storage for the power supply of the device 20 via the IC 120. Diodes 100,101,73,74 are provided to isolate the filter capacitor from signals transmitted from the controller 40 to the IC 120.

If the rectifier circuit of FIG. 2 was comprised of four diodes, and did not include at least a pair of transistors, noise developed in the circuit could result in excess current being provided to the IC 120. Any noise in the circuit shown in FIG. 2 could cause the filtering capacitor 110 can see a spike of noise and drive the voltage in the circuit above the intended peak voltage, beyond the circuits capacity, and potentially causing both diodes 100,101 to disconnect eliminating the ability for the signal to be detected or superimposing the noise voltage on the signal. An advantage of using transistors 71,72 in the present invention is that since transistors 71,72 allow current to flow in both directions, a path is always provided between the internal ground and whichever line 50 or 60 is negative, limiting noise in the circuit. Further, the transistors 71,72 eliminate an diode voltage drop, providing a more desired wire length and providing an improved signal-noise ratio. The use of four transistors instead of two in FIG. 2 further eliminates diode voltage drop.

When line 50 is positive, diode 100 takes the positive signal and shunts the signal to the signal point A. When line 60 is positive, diode 101 takes the positive signal and shunts the signal to the signal point A. The signal from diodes 100 or 101 is superimposed on the signal generated by controller 40 and is extracted by IC 120. Diodes 100,101 remove DC values from signals transmitted through the rectifier circuit to isolate signals transmitted to the IC 120 from the controller 40.

IC 120 includes a comparator 130, which turns the signal generated by the bridge rectifier 70 into a discrete digital signal that is provided to the microprocessor 140 of device 20. The signal at point A is not constant, but is essentially a square wave with a peak voltage of approximately 14–38V, and a low point of approximately 6V. The filter capacitor 110 will respond to the peak of the waveform, and IC 120 and either diode 100 or 101 extract this peak waveform. The filter capacitor 110 ends up with the peak voltage of 13.3 V to 37.3 V, which the filter capacitor 110 supplies as power to the IC 120. The diode 100 or 101 sees the signal before the capacitor does. As the value of the filter capacitor 110 is large, it will take any AC values from a signal and smooth the AC values out, destroying any information content in any transmitted signals. When line 50 is positive, diodes 100 and 73 isolate the filter capacitor 110 from the signal so that the IC 120 can retrieve the signal. Diode 101 at this point is reverse biased, so that it does not effect performance of the circuit. In the alternative, when line 60 is positive, diodes 101 and 74 isolate the filter capacitor 110 from the signal so that the IC 120 can retrieve the signal. Diode 102 is reversed biased at this point. The sensor circuit not only serves to isolate the signals from the controller 40 to the IC 120 from DC voltages on the lines 50,60, it protects the signals from being smoothed out by the filter capacitor 110.

In the present invention, the IC 120 acts as a power supply and regulator for device 20, which is operably connected to the IC 120. The IC 120 is provided with a voltage regulator 160 which takes the peak-input voltage of the circuit from the filter capacitor 110, such as 20–30V, and linearly regulates the voltage down to a lower voltage level, such as 5V, for use by device 20. The IC 120 is provided with a comparator amplifier 150 that extracts the low point of the waveform coming into the IC 120 from the sensor diodes 100,101. The comparator 150 receives in raw signals and power from the sensor diodes 100,101. The comparator 150 is concerned with digital waveform width, and is not concerned with the height of the waveform. The IC 120 is further provided with a pulse width detector 200, operably connected to the output of the comparator 150, which provides START signals to the microprocessor 140 of the device 20. The comparator 150 receives signals from diodes 100,101 and transmits digital data to the microprocessor 140 of the device 20. The IC 120 may turn on circuitry downstream, such as the device 20, and allows for high-speed data transfer to and from the control panel 10 to the device 20.

IC 120 is further provided with a current source 210, such as a transistor, which is operably connected to the microprocessor 140 of the device 20. The microprocessor 140 transmits signals to the IC 120 via the current source 210 through the circuit shown in FIG. 2. IC 120 feeds signal out to the external microprocessor 140 of the device 20 from the control panel 10. At points in waveform when value is around 6V, the transistor 120 is commanded to turn on by microprocessor 140 of the device 20. In situations where the microprocessor 140 is to send signals to the IC 120, the current source 210 is turned on, and draws current through diode 100 if line 50 is positive, or diode 101 if line 60 is positive. When the microprocessor 140 transmits a signal to the controller 40, the current source 210 draws current of about 20 mA from diode 100 and this couples the signal in and provides means for coupling the signal out because it provides a path for the current from the device 20 to the controller 40. The IC 120 draws current from the line, and not the filter capacitor 110 since the sensor diodes 100, 101 isolate the current sensor 210 from the filter capacitor 110. Accordingly, the controller 40 sends voltage signals to the device 20 through the circuitry disclosed in FIG. 2, and receives current signals through the circuitry disclosed in FIG. 2 from the device 20.

Figure 4:
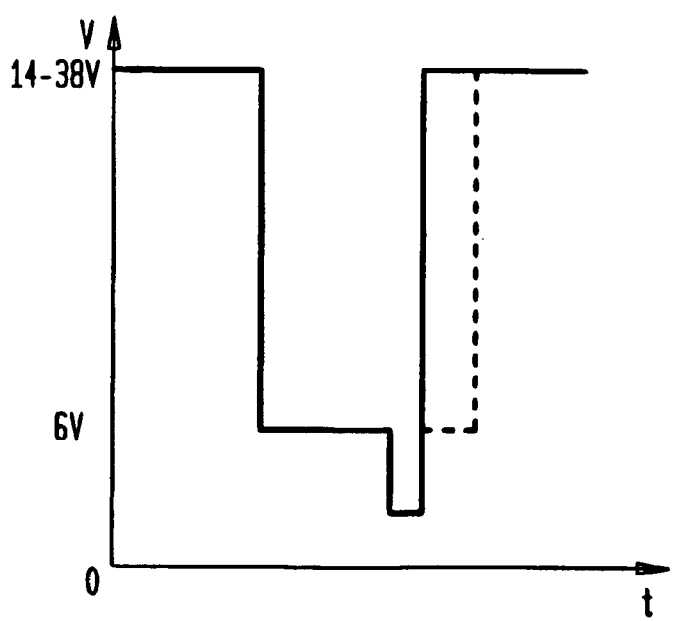
FIG. 4 depicts a waveform of the system when a device attempts to communicate with the control panel.

As shown in FIG. 4, the waveform that is provided to the IC 120 from the microprocessor has two phases. The first phase is the data out to the device 20, and the signal is determined by the width of the pulse. When a device 20 transmits a signal to the IC, a surge of current is added on the waveform. At the end of the pulse, the device 20 can add current to the pulse. This current creates a voltage drop in the waveform, and via the controller creates an "echo" in the next pulse of the waveform. If this pulse is not there, this frame will be shortened, and this is how devices 20 in the system can communicate. When the controller 40 sees current added to the waveform, the pulse of the waveform is stretched out. The stretched pulse indicates to other devices in the system that another device in the system has sent a signal. When a device 20 in the system of the present invention sees the stretched pulse, the device's microprocessor 140 understands that another device 20 of predetermined higher priority is talking to the controller 40 and microprocessor of the device having a lower predetermined priority shuts itself off. A device 20 can determine whether other devices 20 are sending signals to control panel 10 if they see the echo in the pulse waveform. The controller 40 in this case is acting as a repeater in that it takes the current from one device 20, and sends out the signal as a voltage signal so that other devices 20 can see the signal from the device 20.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims. Various features of the invention are set forth in the appended claims.

What is claimed is:

1. A fire safety system comprising:
    a control panel comprised of one or more controllers for controlling a plurality of devices,
    a pair of lines operably connected to said control panel and said devices for communicating signals between said control panel and said devices;
    at least one rectifier circuit operatively connected between said lines and at least one device, wherein said at least one rectifier circuit is comprised of at least a first transistor and a second transistor, each said transistor providing the circuit with a low-impedance ground path when said transistor is turned on, said transistors further providing the circuit with a polarity insensitive output; and
    a sensing circuit operatively connected between each said at least one rectifier circuit and each said at least one device, each said at least one device provided with a device controller, wherein at least one of said sensing circuit and said device controller extract one or more signals from said at least one rectifier circuit to be received by said at least one device.

2. The system according to claim 1 wherein the transistors are field-effect transistors.

3. The system according to claim 1, wherein the transistors are MOSFETs.

4. The system according to claim 1, wherein the rectifier circuit is comprised of four transistors.

5. The system according to claim 1, further comprising of a first capacitor operably connected to said first transistor and a second capacitor operably connected to said second transistor, wherein said first capacitor provides a delay to said first transistor when said first transistor is turned on, and wherein said second capacitor provides a delay to said second transistor when said second transistor is turned on, said capacitors allowing said transistors to continuously provide a low impedance path to ground when a low voltage is applied to the circuit.

6. The system according to claim 1, wherein said first transistor is operatively connected to said first line, and said first capacitor is operatively connected to said second line, and wherein said second transistor is operatively connected to said second line, and said second capacitor is operatively connected to said first line.

7. The system according to claim 1, further comprising a first resistor connected in parallel to said first capacitor to form a first RC circuit and a second resistor connected in parallel with said second capacitor to form a second RC circuit.

8. The system according to claim 1, further comprising a third resistor connected between said first RC circuit and said second line and a fourth resistor connected between said second RC circuit and said first line.

9. The system according to claim 1, further comprising a first diode operatively connected to said first transistor and a second diode operatively connected to said second transistor, said first diode turns on said first transistor when said first transistor receives a signal to turn on and said second diode turns on said second transistor when said second transistor receives a signal to turn on, said first and second diodes further providing the circuit with an initial ground reference.

10. The system according to claim 1, wherein said sensing circuit is comprised of at least two diodes.

11. The system according to claim 1, further comprising:
    a storage capacitor operably connected to each said at least one device for storing energy and providing said at least one device with power, wherein each said sensing circuit isolates the signal transmitted from said at least one rectifier circuit to said at least one device from said storage capacitor.

12. A fire safety system comprising:
    a plurality of devices,
    a control panel for controlling said plurality of devices in said fire safety system, said control panel comprising a central processor unit and one or more controllers operably connected to said central processor unit for transmitting and receiving signals from said devices;
    a pair of lines are connected to said controller for transmitting signals between said control panel and said devices;
    at least one rectifier circuit operatively connected between said lines and at least one device, wherein said at least one rectifier circuit is comprised of at least a first transistor and a second transistor, each said transistor providing the circuit with a low-impedance ground path when said transistor is turned on, said transistors further providing a polarity insensitive output.

13. The system according to claim 12, further comprising a first capacitor operably connected to said first transistor and a second capacitor operably connected to said second transistor, wherein said first capacitor provides a delay to said first transistor when said first transistor is turned on, and wherein said second capacitor provides a delay to said second transistor when said second transistor is turned on, said capacitors allowing said transistors to continuously provide a low impedance path to ground when a low voltage is applied to the circuit.

14. The system according to claim 12, wherein said first transistor is operatively connected to said first line, and said first capacitor is operatively connected to said second line, and wherein said second transistor is operatively couple to said second line, and said second capacitor is operatively connected to said second line.

15. The system according to claim 12, further comprising a first resistor connected in parallel to said first capacitor to form a first RC circuit and a second resistor connected in parallel with said second capacitor to form a second RC circuit.

16. The system according to claim 12, further comprising a third resistor connected in between said first RC circuit and said second line and a fourth resistor connected between said second RC circuit and said first line.

17. The system according to claim 12, further comprising a first diode connected to said first transistor and a second diode couple to said second transistor for turning on said transistor when power is applied to said circuit and for providing the circuit with an initial ground reference.

18. The system according to claim 12, further comprising a Sensing circuit operatively connected between each said at least one rectifier circuit and each said at least one device, each said device connected to a rectifier circuit provided with a device controller, wherein said sensing circuit and said device controller extract a signal from said rectifier circuit to be received by said device.

19. The system according to claim 12, further comprising:
a storage capacitor operably connected to each said at least one device for storing energy and providing said at least one device with power, wherein each said sensing circuit isolates the signal transmitted from said at least one rectifier circuit to said at least one device from said storage capacitor.

20. The safety system according to claim 12, wherein said rectifier circuit is comprised of four transistors.

21. The fire safety system according to claim 1, wherein said rectifier circuit is comprised of a pair of diodes and a pair of transistors.

22. The fire safety system according to claim 1, wherein said pair of lines further provide power from said control panel to said devices.

23. The system according to claim 12, wherein said pair of lines further provide power from said control panel to said devices.

24. The system according to claim 12, wherein said rectifier circuit is comprised of a pair of transistors and a pair of diodes.

25. A circuit for providing a polarity sensing power and signal interface comprising:
a first line and a second line for providing power and signals to one or more devices;
a rectifier circuit operably connected to said lines, wherein said rectifier circuit is comprised of at least a first transistor and a second transistor, each said transistor providing the circuit with a low-impedance path to ground and providing the circuit with a polarity insensitive output;
a first capacitor operably connected to said first transistor and a second capacitor operably connected to said second transistor, wherein said first capacitor provides a delay to said first transistor when said first transistor is turned on to keep said first transistor turned on when a low voltage is applied to said rectifier circuit, and wherein said second capacitor provides a delay to said second transistor when said second transistor is turned on to keep said second transistor turned on when a low voltage is applied to said rectifier circuit, said capacitors allowing said transistors to provide a low impedance path to ground when a low voltage is applied to the circuit.

26. The circuit according to claim 25, wherein the rectifier circuit is comprised at tour transistors, said transistors reducing voltage drop losses.

27. The circuit according to claim 25, wherein said first transistor is operatively connected to said first line, and said first capacitor is operatively connected to said second line, and wherein said second transistor is operatively connected to said second line, and said second capacitor is operatively connected to said first line.

28. The circuit according to claim 25, further comprising a first diode operably connected to said first transistor and a second diode operably connected to said second transistor, wherein when said transistors are signaled to turned on, said diodes increase the speed in which said transistors are turned on, wherein said diodes further provide the circuit with an initial ground reference.

29. The circuit according to claim 25, further comprising a first resistor connected in parallel with said first capacitor to form a first RC circuit and a second resistor connected in parallel with said second capacitor to form a second RC circuit.

30. The circuit according to claim 25, further comprising a third resistor connected between said first RC circuit and said second line and a fourth resistor connected between said second RC circuit and said first line.

31. The circuit according to claim 25 wherein said transistors are field-effect transistors.

32. The circuit according to claim 25, wherein said transistors are MOSFETs.

33. A circuit for providing a polarity sensing power and signal interface comprising:
a first line and a second line;
a rectifier circuit operably connected to said lines, wherein said rectifier circuit is comprised of at least a first transistor and a second transistor, each said transistor providing the circuit with a low-impedance path to ground and providing the circuit with a polarity insensitive output;
a first capacitor operably connected to said first transistor and a second capacitor operably connected to said second transistor, wherein said first capacitor provides a delay to said first transistor when said first transistor is turned on to keep said first transistor turned on when a low voltage is applied to said rectifier circuit, and wherein said second capacitor provides a delay to said second transistor when said second transistor is turned on to keep said second transistor turned on when a low voltage is applied to said rectifier circuit, said capacitors allowing said transistors to provide a low impedance path to ground when a low voltage is applied to the circuit; and
a first diode operably connected to said first transistor and a second diode operably connected to said second transistor, wherein said diodes increase the speed in which the transistors are turned on, said diodes further providing the circuit with an initial ground reference.

34. The circuit according to claim 33, wherein the rectifier circuit is comprised of four transistors.

35. The circuit according to claim 33, wherein said first transistor is operatively connected to said first line, and said first capacitor is operatively connected to said second line, and wherein said second transistor is operatively connected to said second line, and said second capacitor is operatively connected to said first line.

36. The circuit according to claim 33, further comprising a first resistor connected in parallel to said first capacitor to form a first RC circuit and a second resistor connected in parallel with said second capacitor to form a second RC circuit.

37. The circuit according to claim 33, further comprising a third resistor connected in between said first RC circuit and said second line and a fourth resistor connected between said second RC circuit and said first line.

38. The circuit according to claim 33, wherein the transistors are field-effect transistors.

39. The circuit according to claim 33, wherein the transistors are MOSFETs.

40. The circuit according to claim 33, wherein said rectifier circuit is comprised of a pair of transistors and a pair of diodes.

41. The circuit according to claim 33, wherein said first and second lines provide signals and power to one or more devices operatively connected to said first and second lines.

42. The circuit according to claim 33, further comprising a controller operatively connected to said first and second lines, wherein said first and second lines are provided to allow said controller to transmit signals to said one or more devices and to allow said one or more devices to transmit signals to said controller.

43. The circuit according to claim 33, further comprising a controller operatively connected to said first and second lines, wherein said first and second lines are provided to allow said controller to transmit signals to said one or more devices and to allow said one or more devices to transmit signals to said controller.

* * * * *